(12) United States Patent
Ikemura et al.

(10) Patent No.: US 12,456,933 B2
(45) Date of Patent: Oct. 28, 2025

(54) CONTROL APPARATUS, CONTROL METHOD, AND NON-TRANSITORY COMPUTER READABLE RECORDING MEDIUM

(71) Applicant: TOYOTA JIDOSHA KABUSHIKI KAISHA, Aichi-ken (JP)

(72) Inventors: Ryosuke Ikemura, Susono (JP); Shogo Tsuge, Fuji (JP); Toshiya Hashimoto, Miyoshi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 293 days.

(21) Appl. No.: 18/299,052

(22) Filed: Apr. 12, 2023

(65) Prior Publication Data

US 2023/0336095 A1    Oct. 19, 2023

(30) Foreign Application Priority Data

Apr. 13, 2022   (JP) .................................. 2022-066445

(51) Int. Cl.
*H02M 7/5395* (2006.01)

(52) U.S. Cl.
CPC ................................. *H02M 7/5395* (2013.01)

(58) Field of Classification Search
CPC .................................................. H02M 7/5395
USPC ........................................................... 363/41
See application file for complete search history.

(56) References Cited

U.S. PATENT DOCUMENTS

| 2015/0091510 A1* | 4/2015 | Iwawaki | B60L 53/126 |
| | | | 320/108 |
| 2017/0085133 A1* | 3/2017 | Byun | H02J 50/20 |
| 2018/0090995 A1 | 3/2018 | Arasaki et al. | |

FOREIGN PATENT DOCUMENTS

JP    6361818 B2    7/2018

* cited by examiner

*Primary Examiner* — Thienvu V Tran
*Assistant Examiner* — Lauren Ashley Shaw
(74) *Attorney, Agent, or Firm* — HAUPTMAN HAM, LLP (57) ABSTRACT

A control apparatus for a power receiver which wirelessly receives electric power from a power transmitter. The control apparatus being configured to execute a restriction process that restricts received power by PWM control depending on an amount of the received power. The restriction process comprises calculating an increase gap which is a difference between an initial received power and a local maximum value of the received power with respect to a change in a duty in the PWM control, starting the PWM control when a first value which is a value obtained by adding the increase gap to a current received power exceeds a second value which is a value obtained by subtracting a predetermined margin from an upper limit of the received power, and increasing the duty until the received power becomes lower than the initial received power when starting the PWM control.

4 Claims, 9 Drawing Sheets

CONTROL APPARATUS, CONTROL METHOD, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2022-066445, filed Apr. 13, 2022, the contents of which application are incorporated herein by reference in their entirety.

BACKGROUND

Technical Field

The present disclosure relates to a technique for controlling a power receiver which wirelessly receives electric power from a power transmitter.

Background Art

In recent years, there has been proposed a wireless power transmission system in which a power transmitter wirelessly transmits electric power to a power receiver. Regarding the wireless power transmission system, in order to protect the power receiver or batteries from occurrence of overvoltage or the like due to an excessive increase in received power, a technique for restricting the received power by switching control has been considered.

Patent Literature 1 discloses a wireless power receiving device comprising a power receiving side resonant circuit provided with a power receiving coil wirelessly receiving electric power from a power feeding side and a power receiving side resonant capacitor connected to the power receiving coil, a rectifier circuit in which the electric power received by the power receiving coil is rectified to be output to a load, a power receiving side voltage detecting portion for detecting an output voltage of the rectifier circuit, a short circuit provided with a switching element connected between an output portion of the power receiving side resonant circuit and an output portion of the rectifier circuit, and a controlling circuit which operates the switching element when a value of the output voltage detected by the power receiving side voltage detecting portion exceeds a preset reference voltage value.

LIST OF RELATED ART

Patent Literature 1: JP 6361818 B2

SUMMARY

It is conceivable to employ PWM control as switching control for restricting the received power. The PWM control has the advantage that it can be implemented with a simple configuration and the received power can be easily adjusted by changing the duty in the PWM control. However, when increasing the duty to restrict the power receiver in the PWM control, a zone in which the received power is greater than the received power when the restriction is not performed (hereinafter, also referred to as a "power increase zone") exists in principle. Therefore, the received power may increase rapidly and exceed the upper limit determined by the power rating when restricting the received power. Consequently, the power receiver may not be properly protected.

In view of the above-described problem, an object of the present disclosure is to provide a technique capable of suppressing occurrence of an overshoot of the received power when restricting the received power by the PWM control.

A first disclosure is directed to a control apparatus for a power receiver which wirelessly receives electric power from a power transmitter.

The control apparatus is configured to execute a restriction process that restricts received power by PWM control depending on an amount of the received power.

The restriction process comprises:
calculating an increase gap which is a difference between an initial received power, which is the received power when the restriction process is not executed, and a local maximum value of the received power with respect to a change in a duty in the PWM control;
starting the PWM control when a first value which is a value obtained by adding the increase gap to a current received power exceeds a second value which is a value obtained by subtracting a predetermined margin from an upper limit of the received power; and
increasing the duty until the received power becomes lower than the initial received power when starting the PWM control.

A second disclosure is directed to a control apparatus having the following features with respect to the control apparatus according to the first disclosure.

The restriction process further comprises:
when the current received power exceeds the initial received power, refraining from decreasing the duty until the first value becomes smaller than the second value; and
decreasing the duty to zero when the first value becomes smaller than the second value.

A third disclosure is directed to a control apparatus having the following features with respect to the control apparatus according to the first or second disclosure.

The control apparatus further comprises a memory which stores information on a change characteristic of the received power with respect to the change in the duty in the PWM control.

The calculating the increase gap in the restriction process comprises:
estimating a coupling coefficient between the power transmitter and the power receiver based on the current received power; and
calculating the increase gap based on the coupling coefficient and the change characteristic.

A fourth disclosure is directed to a control apparatus having the following features with respect to the control apparatus according to the third disclosures.

The control apparatus is further configured to execute:
a process that acquires specification information and identification information of the power transmitter predicted to become a source of the received power; and
a process that identifies the power transmitter being the source based on the identification information before starting power receiving.

The restriction process further comprises calculating the change characteristic based on the specification information of the identified power transmitter.

A fifth disclosure is directed to a control method for controlling a power receiver which wirelessly receives electric power from a power transmitter.

The control method comprises restricting received power by PWM control depending on an amount of the received power.

The restricting the received power by the PWM control comprises:
  calculating an increase gap which is a difference between an initial received power, which is the received power when the restriction process is not executed, and a local maximum value of the received power with respect to a change in a duty in the PWM control;
  starting the PWM control when a first value which is a value obtained by adding the increase gap to a current received power exceeds a second value which is a value obtained by subtracting a predetermined margin from an upper limit of the received power; and
  increasing the duty until the received power becomes lower than the initial received power when starting the PWM control.

A sixth disclosure is directed to a control method having the following features with respect to the control apparatus according to the fifth disclosure.

The restricting the received power by the PWM control further comprises:
  when the received power exceeds the initial received power, refraining from decreasing the duty until the first value becomes smaller than the second value; and
  decreasing the duty to zero when the first value becomes smaller than the second value.

A seventh disclosure is directed to a control program for controlling a power receiver which wirelessly receives electric power from a power transmitter.

The control program, when executed by a computer, causes the computer to execute a restriction process that restricts received power by PWM control depending on an amount of the received power.

The restriction process comprises:
  calculating an increase gap which is a difference between an initial received power, which is the received power when the restriction process is not executed, and a local maximum value of the received power with respect to a change in a duty in the PWM control;
  starting the PWM control when a first value which is a value obtained by adding the increase gap to a current received power exceeds a second value which is a value obtained by subtracting a predetermined margin from an upper limit of the received power;
  and increasing the duty until the received power becomes lower than the initial received power when starting the PWM control.

An eighth disclosure is directed to a control program having the following features with respect to the control program according to the seventh disclosure.

The restriction process further comprises:
  when the received power exceeds the initial received power, refraining from decreasing the duty until the first value becomes smaller than the second value; and
  decreasing the duty to zero when the first value becomes smaller than the second value.

A ninth disclosure is directed to a wireless power transmission system.

The wireless power transmission system comprises a power receiver, a power transmitter which wirelessly transmits electric power to the power receiver, one or more processors, and a memory.

The memory stores executable instructions that, when executed by the one or more processors, cause the one or more processors to execute a restriction process that restricts received power by PWM control depending on an amount of the received power.

The restriction process comprises:
  calculating an increase gap which is a difference between an initial received power, which is the received power when the restriction process is not executed, and a local maximum value of the received power with respect to a change in a duty in the PWM control;
  starting the PWM control when a first value which is a value obtained by adding the increase gap to a current received power exceeds a second value which is a value obtained by subtracting a predetermined margin from an upper limit of the received power; and
  increasing the duty until the received power becomes lower than the initial received power when starting the PWM control.

A tenth disclosure is directed to a wireless power transmission system having the following features with respect to the wireless power transmission system according to the ninth disclosure.

The restriction process further comprises:
  when the received power exceeds the initial received power, refraining from decreasing the duty until the first value becomes smaller than the second value; and
  decreasing the duty to zero when the first value becomes smaller than the second value.

According to the present disclosure, the PMW control is started when the first value which is a value obtained by adding the increase gap to the current received power exceeds the second value which is a value obtained by subtracting the predetermined margin from the upper limit of the received power. Furthermore, when starting the PWM control, the duty is increased until the received power becomes lower than the initial received power which is the received power when the restriction process is not executed. It is thus possible to suppress occurrence of an overshoot of the received power when the PWM control is started.

Furthermore, according to the present disclosure, when the received power exceeds the initial received power, decreasing the duty is refrained until the first value becomes smaller than the second value. And the duty is decreased to zero when the first value becomes smaller than the second value. It is thus possible to suppress occurrence of an overshoot of the received power when the PWM control ended.

EMBODIMENTS

Hereinafter, an embodiment of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the invention is explicitly specified by the numerals theoretically. Furthermore, structures or the like that are described in conjunction with the following embodiment is not necessarily essential to the concept of the present disclosure unless explicitly described otherwise, or unless the present disclosure is explicitly specified by the structures or the like theoretically. Note that in the respective drawings, the same or corresponding parts are assigned with the same reference signs, and redundant explanations of the parts are properly simplified or omitted.

1. Wireless Power Transmission System

Figure 1:
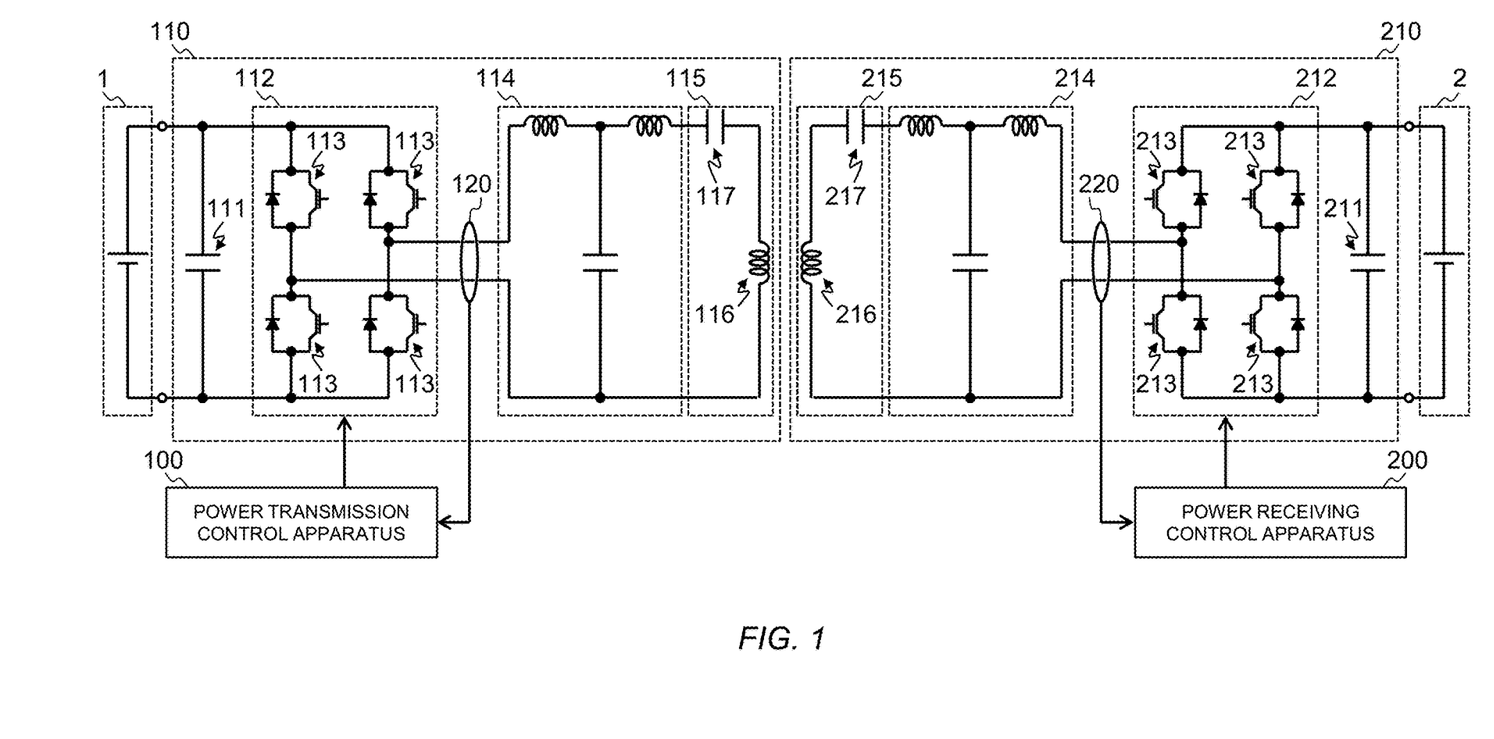
FIG. 1 is a circuit diagram showing a configuration example of a wireless power transmission system according to the present embodiment.

The present embodiment relates to a wireless power transmission system in which a power transmitter wirelessly transmits electric power to a power receiver. FIG. 1 is a circuit diagram showing a configuration example of the wireless power transmission system according to the present embodiment. FIG. 1 shows a case where the wireless power transmission system is applied to a charging system which charges a battery 2 with electric power supplied from a DC power supply 1. The DC power supply 1 supplies electric power to a power transmitter 110. And the power transmitter 110 wirelessly transmits electric power to a power receiver 210. Then, the battery 2 is charged with received power of the power receiver 210.

The DC power supply 1 and the power transmitter 110 are typically placed on the ground, floor, wall or the like. The power receiver 210 and the battery 2 are typically mounted on a moving object to be charged such as a portable device, a vehicle, or the like. The battery 2 is typically a rechargeable battery such as a lithium-ion battery, a nickel-metal hydride battery, or the like.

In the wireless power transmission system shown in FIG. 1, a transmitter coil 116 included in the power transmitter 110 and a receiver coil 216 included in the power receiver 210 magnetically resonate with each other. Then, electric power is transmitted from the transmitter coil 116 to the receiver coil 216. That is, in the wireless power transmission system according to the present embodiment, power transmission is performed by resonant inductive coupling.

The power transmitter 110 comprises a smoothing capacitor 111, a power inverter 112, a filter circuit 114, and a power transmission circuit 115. The power inverter 112, the filter circuit 114, and the power transmission circuit 115 are configured to be connected in cascaded connection.

The power inverter 112 converts DC power into AC power. And the power inverter 112 outputs the converted power. The output power of the power inverter 112 is supplied to the power transmission circuit 115 through the filter circuit 114.

The power inverter 112 is a single-phase full-bridge circuit including switching devices 113. The power inverter 112 is connected to the power transmission control apparatus 100. The power transmission control apparatus 100 performs switching control of the switching devices 113 based on information acquired from a measuring device 120. Examples of the measuring device 120 include an ammeter, a voltmeter, or the like. By the power transmission control apparatus 100 performing the switching control, the frequency and amplitude of the output power of the power inverter 112 are controlled. Consequently, transmission power of the power transmitter 110 is controlled. In particular, the frequency of the output power of the power inverter 112 are adjusted to be equivalent to the resonant frequency of the power transmission circuit 115. In this sense, the resonance frequency of the power transmission circuit 115 can also be referred to as a "drive frequency". The information that the power transmission control apparatus 100 acquires from the measuring device 120 includes at least an output current and an output voltage of the power inverter 112.

The filter circuit 114 reduces electromagnetic noise of the output power of the power inverter 112. The filter circuit 114 is composed of coils and a capacitor. And the filter circuit 114 functions as a low-pass filter. And the impedance of the power transmitter 110 is adjusted by the filter circuit 114.

The power transmission circuit 115 is a resonance circuit including the transmitter coil 116 and a resonance capacitor 117. By the power inverter 112 supplying electric power with the resonant frequency to the power transmission circuit 115, the transmitter coil 116 magnetically resonate with the receiver coil 216. As a result, electric power is transmitted from the transmitter coil 116 to the receiver coil 216.

The power receiver 210 includes a smoothing capacitor 211, an active rectifier 212, a filter circuit 214, and a power receiving circuit 215. The active rectifier 212, the filter circuit 214, and the power receiving circuits 215 are configured to be connected in cascade connection.

The power receiving circuit 215 is a resonance circuit including the receiver coil 216 and a resonance capacitor 217. The resonance frequency of the power receiving circuit 215 is configured to be equal to the resonance frequency of the power transmission circuit 115. The receiver coil 216 magnetically resonate with the transmitter coil 116. Then, the receiver coil 216 receives electric power transmitted from the transmitter coil 116.

The filter circuit 214 reduces electromagnetic noise of electric power received by the power receiving circuit 215. The filter circuit 214 is composed of coils and a capacitor. And the filter circuit 214 functions as a low-pass filter. And the impedance of the power receiver 210 is adjusted by the filter circuit 214.

The active rectifier 212 converts electric power received by the power receiving circuit 215 into DC power. And the active rectifier 212 outputs the converted power. The output power of the active rectifier 212 is supplied to the battery 2 through the smoothing capacitor 211. That is, the output power of the active rectifier 212 is received power of the power receiver 210.

The active rectifier 212 is a single-phase bridge rectifier circuit including switching devices 213. The active rectifier 212 is connected to a power receiving control apparatus 200. The power receiving control apparatus 200 performs switching control of the switching devices 213 based on information acquired from a measuring device 220. By the power receiving control apparatus 200 performing the switching control, the output power of the active rectifier 212 (the received power of the power receiver 210) is controlled.

More specifically, by the power receiving control apparatus 200 performing the switching control of switching on/off of the switching devices 213, a short circuit is temporarily formed in the active rectifier 212. When forming the short circuit, the output power of the active rectifier 212 is hardly supplied to the battery 2. Therefore, by temporarily forming the short circuit through the switching control, it is possible to restrict the output power of the active rectifier 212 (the received power of the power receiver 210). When restricting the received power in the power receiver 210, it can be said that the power receiver 210 is in "short circuit mode" since the short circuit is temporarily formed. Hereinafter, a process that restricts the received power by the switching control is referred to as a "restriction process".

The power receiving control apparatus 200 typically executes the restriction process for the purpose of protecting the power receiver 210 and the battery 2. Therefore, the restriction process is typically executed to refrain from the received power exceeding an upper limit determined by the power rating of the power receiver 210 or the battery 2.

Figure 2:
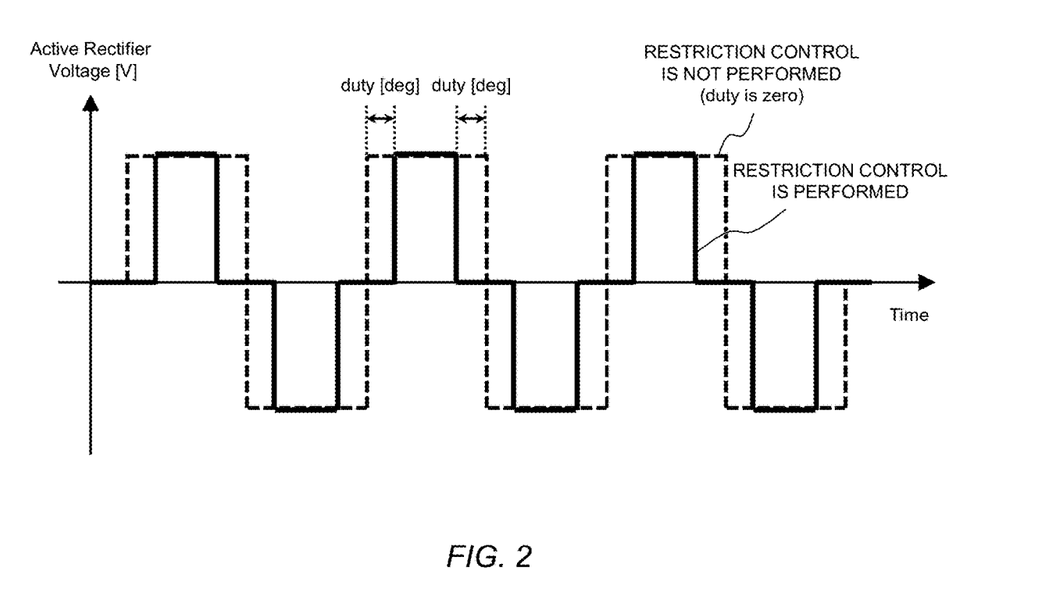
FIG. 2 is a conceptual diagram for explaining the restriction process by PWM control.

In the present embodiment, the power receiving control apparatus 200 is configured to execute the restriction process employing PWM control as the switching control. That is, how long the short circuit is formed is determined by the duty in the PWM control. FIG. 2 shows an example of the voltage of the active rectifier 212 when the restriction process employing the PWM control is executed. FIG. 2 shows a graph (dashed line) when the restriction process is not executed and a graph (solid line) when the restriction process employing the PWM control is executed. As shown in FIG. 2, when the restriction process by the PWM control is executed, the period in which the short circuit is formed is determined by the duty in the PWM control. That is, by increasing the duty, the restriction of the received power can be further strengthened.

As described above, the wireless power transmission system according to the present embodiment is configured. The wireless power transmission system shown in FIG. 1 is configured that the DC power supply 1 supplies electric power to the power transmitter 110. But the wireless power transmission system may be configured that an AC power supply supplies electric power to the power transmitter 110. In this case, by providing a converter at the input stage of the power transmitter 110, a configuration similar to that of FIG. 1 can be achieved.

Figure 3:
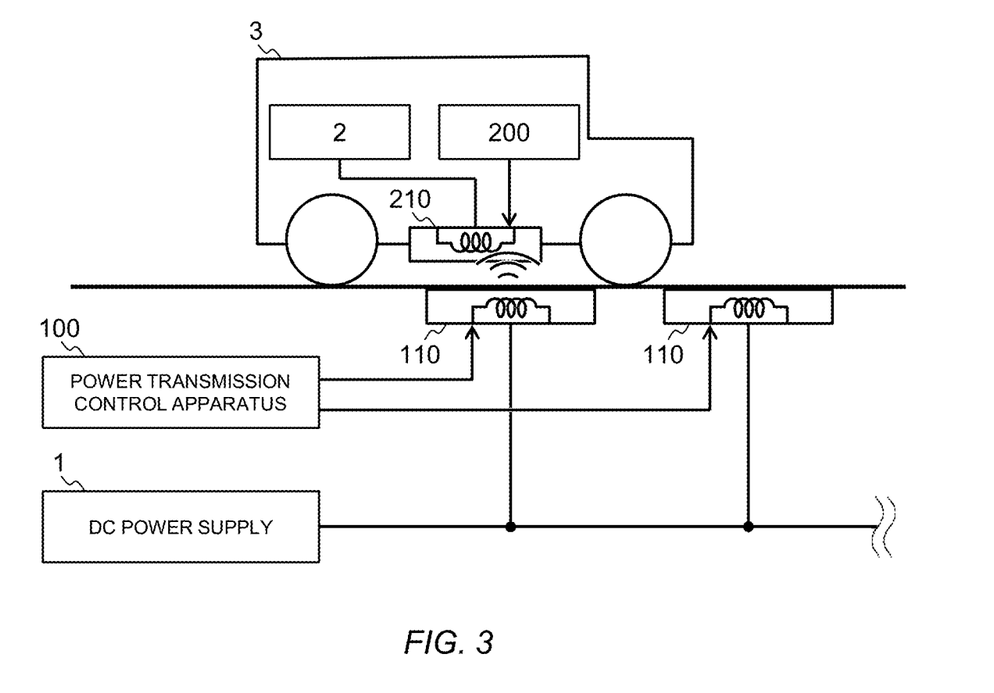
FIG. 3 is a conceptual diagram showing an example in which the wireless power transmission system is applied to a charging system that charges the battery mounted on a vehicle.

The wireless power transmission system according to the present embodiment may include a plurality of the power transmitters 110 or a plurality of the power receivers 210. For example, the wireless power transmission system may be applied to a charging system that charges the battery 2 mounted on a vehicle while the vehicle is traveling. FIG. 3 shows an example in which the wireless power transmission system is applied to the charging system that charges the battery 2 while the vehicle 3 is traveling. In the example shown in FIG. 3, when the vehicle 3 passes through a plurality of the power transmitters 110 arranged in series on the travel path of the vehicle 3, the power receiver 210 mounted on the vehicle 3 wirelessly receives electric power and charges the battery 2. Although two power transmitters 110 are shown in FIG. 3, more power transmitters 110 may be arranged over a longer distance. In this case, considering that there may be a plurality of similar vehicles 3, the wireless power transmission system includes a plurality of the power receivers 210.

Figure 4:
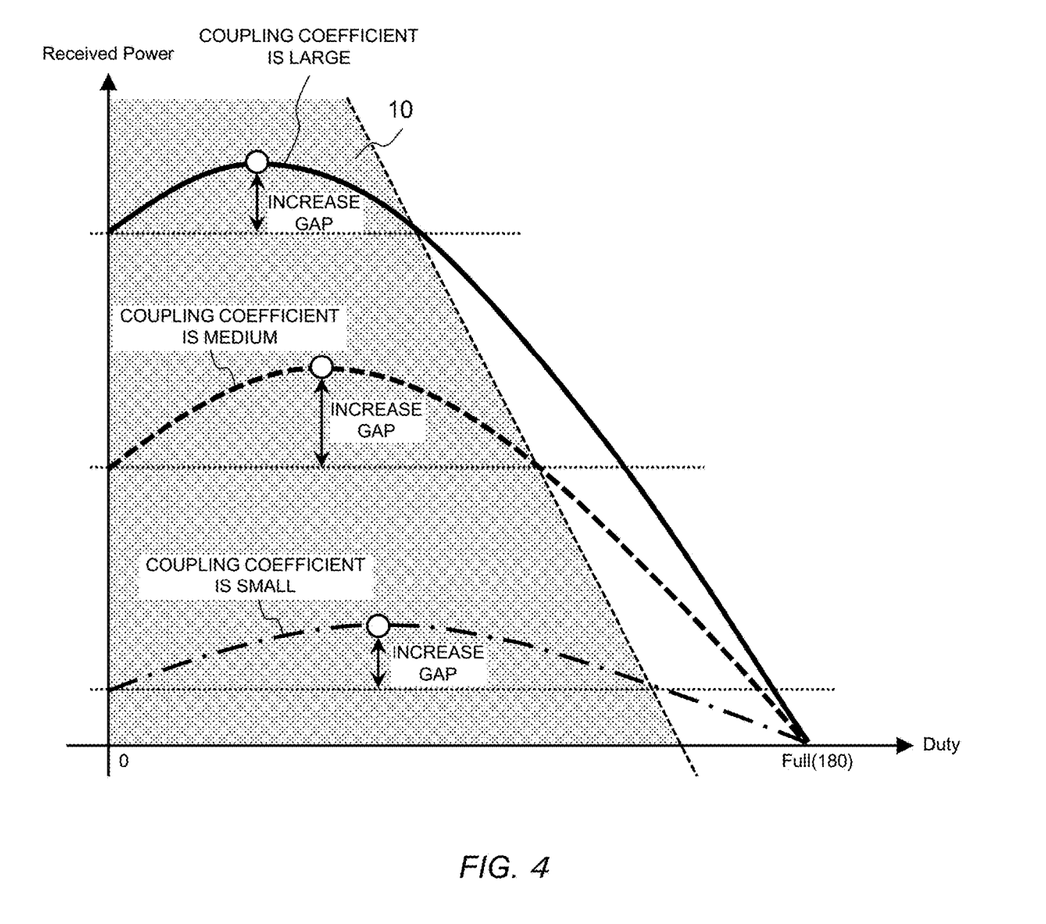
FIG. 4 is a graph showing an example of a change characteristic of the received power with respect to a change in a duty in the PWM control.

In the restriction process. the power receiving control apparatus 200 performs restricting the received power by increasing the duty in the PWM control. However, when increasing the duty, a power increase zone in which the received power is greater than the received power when the restriction process is note executed (hereinafter, referred to as an "initial received power") exists in principle. This is because the impedance of the power transmitter 110 as seen from the side of the power receiver 210 changes as the duty changes. FIG. 4 shows a example of a change characteristic of the received power with respect to a change in the duty in the PWM control for three cases where coupling coefficient between the power transmitter 110 and the power receiver 210 differs from each other (large (solid line), medium (dashed line line), and small (chain line)). As shown in FIG. 4, the change characteristic of the received power is different depending on the coupling coefficient. On the other hand, the power increase zone 10 exists in each case. FIG. 4 shows, for each of the three cases where the coupling coefficient differs from each other, an increase gap which is a difference between the initial received power which is the received power when the duty is zero and a local maximum value (illustrated by a circle in FIG. 3) of the received power with respect to the change in the duty.

Since the power increase zone 10 exists as described above, an overshoot that the received power increase rapidly and exceed the upper limit may occur when the power receiving control apparatus 200 executes the restriction process by the PWM control. In particular, situations in which the overshoot may occur include when the PWM control is started and when the PWM control is ended. For example, if the PWM control is started to increase the duty when the received power is near the upper limit, the overshoot of the received power may occur because the received power increases in the power increase zone 10. Also, for example, if the duty is decreased to zero in order to end the PWM control when the received power has started to decrease, the overshoot of the received power may occur because the restriction of the received power is excessively canceled with respect to the decrease in the received power.

Frequent occurrence of the overshoot causes deterioration or failure of the power receiver 210 and the battery 2. For this reason, it is required to suppress occurrence of the overshoot. For the purpose of suppressing occurrence of the overshoot, the wireless power transmission system according to the present embodiment has a feature in the restriction process executed by the power receiving control apparatus 200. In the restriction process, the power receiving control apparatus 200 according to the present embodiment is characterized by a process executed when starting the PWM control and a process executed while the PWM control being performed. The restriction process executed by the power receiving control apparatus 200 according to the present embodiment will be described below.

2. Restriction Process

The power receiving control apparatus 200 according to the present embodiment manages in advance the change characteristic of the received power with respect to the change in the duty (see FIG. 4) for the power transmitter 110 being a source of the received power. The change characteristic of the received power as shown in FIG. 4 is determined by electronic circuit information of the power transmitter 110 and the power receiver 210. Examples of electronic circuit information include a circuit configuration, a drive frequency, inductances of the transmitter coil 116 and the receiver coil 216, a resistance value, a capacitance value, a power supply voltage, and the like. That is, the change characteristic of the received power can be uniquely determined by a pair of the power transmitter 110 and the power receiver 210. The power receiving control apparatus 200 may be configured to store mapping information as shown in FIG. 4 in a memory in advance.

In a case where the wireless power transmission system includes a plurality of the power transmitters 110 or a plurality of the power receivers 210, it is assumed that the change characteristic of the received power differs depending on a pair of the power transmitter 110 and the power receiver 210. Therefore, in order to acquire the change characteristic of the received power for the power transmitter 110 being a source of the received power, the power receiving control apparatus 100 according to the present embodiment may be configured to execute the following process.

First, the power receiving control apparatus 200 executes a process that acquires specification information and identification information of the power transmitter 110 predicted to become a source of the received power. The specification information includes the electronic circuit information of the power transmitter 110. The identification information is, for example, information regarding a location or an area where the power transmitter 110 is placed. Alternatively, the identification information is identification number linked to each of the plurality of the power transmitters 110. The power receiving control apparatus 200 manages the specification information and the identification information in association with each other. The power receiving control apparatus 200 may acquire these information through a wide-range communication when the power transmitter 110 and the power receiver 210 are separated from each other.

Next, the power receiving control apparatus 200 executes a process that identifies the power transmitter 110 being the source of the received power based on the identification information acquired in advance before starting power receiving. For example, in a case where the identification information is location information, when the location of the power receiver 210 is in the vicinity of any one of the plurality of the power transmitters 110, the power receiving control apparatus 200 identifies the one power transmitter 110 as the source of the received power.

Next, the power receiving control apparatus 200 calculates the change characteristic of the received power based on the specification information of the identified power transmitter 110. For example, the power receiving control apparatus 200 refers to the specification information using the identification information of the identified power transmitter 110. And the power receiving control apparatus 200 calculates the change characteristic of the received power based on the specification information of the power receiver 210 and the specification information of the identified power transmitter 110.

Figure 5:
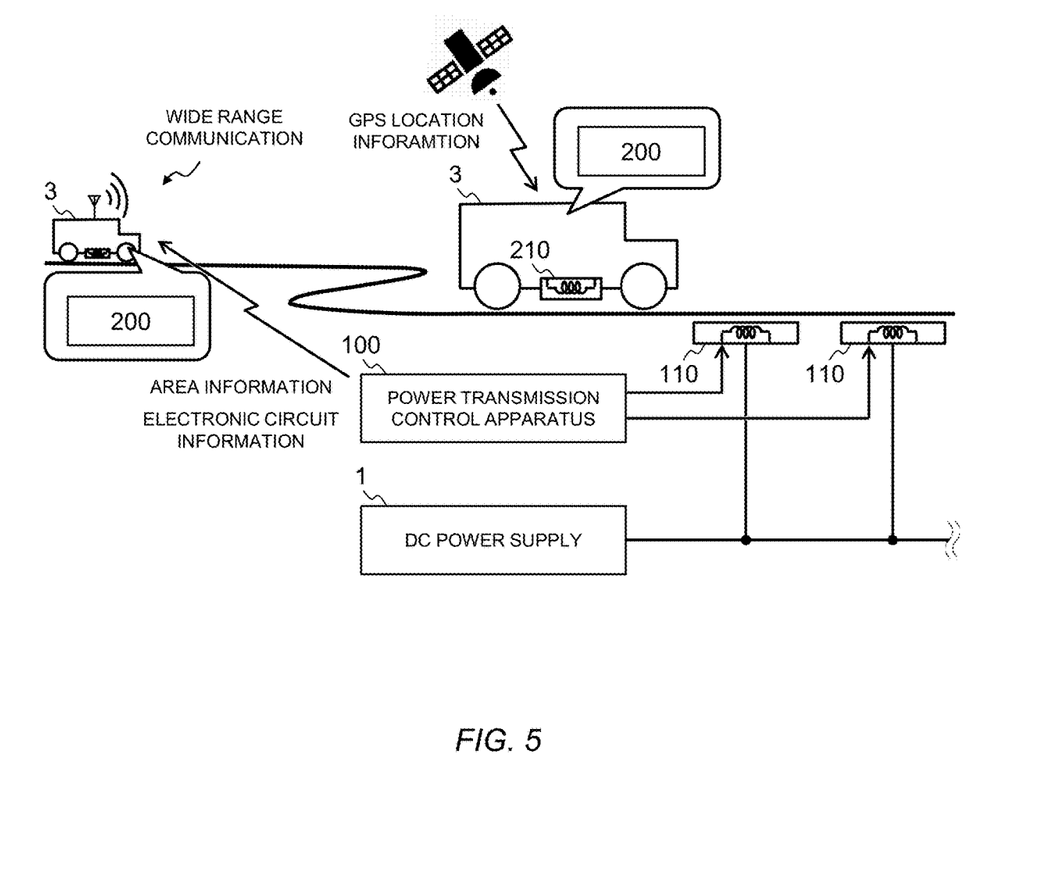
FIG. 5 is a conceptual diagram showing an example in which a process for calculating the change characteristic in the case shown in FIG. 3.

FIG. 5 is a conceptual diagram showing an example in which the power receiving control apparatus 200 performs the process described above in the case shown in FIG. 3. In the example shown in FIG. 5, the power receiving control apparatus 200 first performs wide-range communication with the power transmission control apparatus 100 of a plurality of the power transmitters 110 arranged in an area where the vehicle 3 is predicted to travel (e.g., predicted from a travel plan of the vehicles 3). And the power receiving control apparatus 200 acquires area information as the identification information and electric circuit information of the power transmitter 110 as the specification information. Examples of the wide-range communication include wireless broadband communication such as LTE, 4G, or the like. Next, the power receiving control apparatus 200 acquires GPS position information from time to time while the vehicle 3 is traveling. And the power receiving control apparatus 200 identifies the power transmitter 110 being the source of the received power based on the GPS position information and the area information. Then, the power receiving control apparatus 200 can acquire the electronic circuit information of the power transmitter 110 being the source of the received power. Next, the power receiving control apparatus 200 calculates the change characteristic of the received power for the power transmitter 110 being the source of the received power and starts power receiving.

By the power receiving control apparatus 200 executing the process described above, even in a case where the wireless power transmission system includes a plurality of the power transmitters 110 or a plurality of the power receivers 210, it is possible to manage change characteristic of the received power for the power transmitter 110 being the source of the received power in advance before starting power receiving.

2-1. Process Executed when Starting PWM Control

Figure 6:
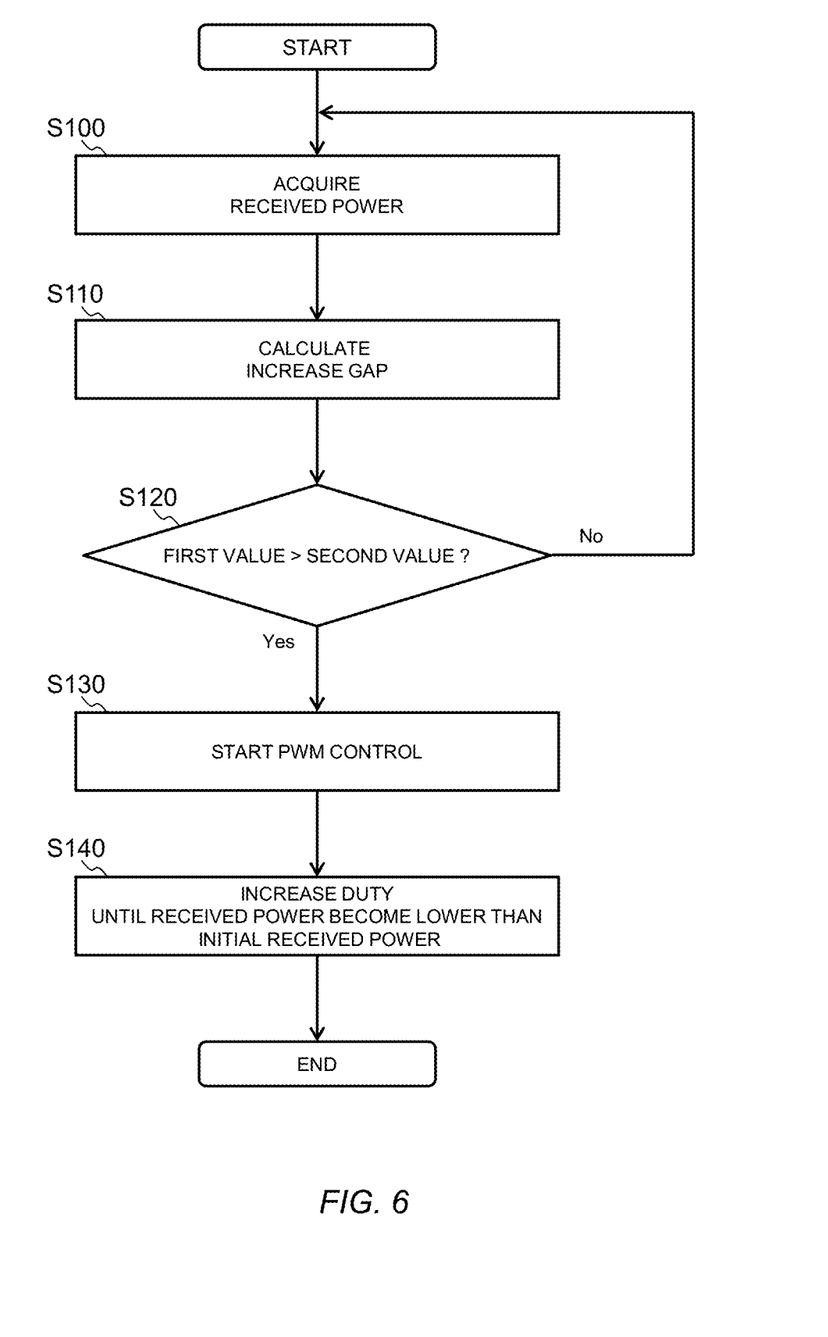
FIG. 6 is a flowchart showing an example of processes executed by a power receiving control apparatus according to the present embodiment.

In the following, the process executed when the power receiving control apparatus 200 according to the present embodiment when starting the PWM control will be described. FIG. 6 is a flowchart showing process executed when the power receiving control apparatus 200 according to the present embodiment starting the PWM control. The flowchart shown in FIG. 6 is repeatedly executed at a predetermined processing cycle when the PWM control is not started (when the received power is not restricted). In the following description, it is assumed that the power receiving control apparatus 200 manages in advance, for the power transmitter 110 being the source of the received power, the change characteristic of received power with respect to the change in the duty.

In step S100, the power receiving control apparatus 200 acquires a current received power of the power receiver 210. For example, the power receiving control apparatus 200 the current received power of the power receiver 210 from the measuring device 220. Alternatively, the power receiving control apparatus 200 may be configured to calculate the current received power from an output current and an output voltage of the power receiver 210 acquired from the measuring device 220.

After step S100, the process proceeds to step S110.

In step S110, the power receiving control apparatus 200 calculates the increase gap based on the change characteristic of the received power. When the change characteristic of the received power is given by mapping information or the like, the increase gap can be calculated if the coupling coefficient between the power transmitter 110 and the power receiver 210 is determined. Here in step S110, noting that the PWM control has not been started yet (that is, the duty is zero), as shown in FIG. 4, the coupling coefficient can be estimated based on the current received power acquired in step S100. As described above, by estimating the coupling coefficient based on the current received power acquired in step S100, the power receiving control apparatus 200 can calculate the increase based on the change characteristic of the received power managed in advance.

After step S110, the process proceeds to step S120.

In step S120, the power receiving control apparatus 200 determines whether or not a first value exceeds a second value. Here, the first value is a value obtained by adding the increase gap calculated in step S110 to the current received power acquired in step S110. And the second value is a value obtained by subtracting a predetermined margin from the upper limit of the received power. It is desirable that the predetermined margin is sufficiently set depending on a measurement error of the received power.

When the first value does not exceed the second value (step S120; No), the power receiving control apparatus 200 does not start the PWM control in the current processing. Then the process returns to step S100.

When the first value exceeds the second value (step S120; Yes), the power receiving control apparatus 200 starts the PWM control (step S130). Then in step S140, when starting the PWM control, the power receiving control apparatus 200 increases the duty until the received power become lower than the initial received power, that is, until the received power leaves the power increase zone 10. After the process shown in FIG. 6 ends, the power receiving control apparatus 200 performs a normal control to restrict the received power depending on an amount of the received power. For example, the power receiving control apparatus 200 changes the duty in the PWM control by feedback regarding the amount of the received power.

As described above, the power receiving control apparatus 200 according to the present embodiment increases the duty until the received power leaves the power increase zone 10 when starting the PWM control. It is thus possible to perform the PWM control in a zone where the received power is lower than the initial received power after the PWM control is started. In particular, the power receiving control apparatus 200 according to the present embodiment starts the PWM control when the first value which is a value obtained by adding the increase gap to the current received power exceeds the second value which is a value obtained by subtracting the predetermined margin from the upper limit of the received power. It is thus possible to suppress occurrence of the overshoot when increasing the duty. As described above, according to the power receiving control apparatus 200, it is possible to suppress occurrence of the overshoot when the PWM control is started. And, by the power receiving control apparatus 200 executing the processes described above, a control method for controlling the power receiver 210 corresponding to the flowchart shown in FIG. 6 is realized. Further, a control program causing the power receiving control apparatus 200 to execute the processes described above can be realized.

2-2. Process Executed while PWM Control being Performed

Figure 7:
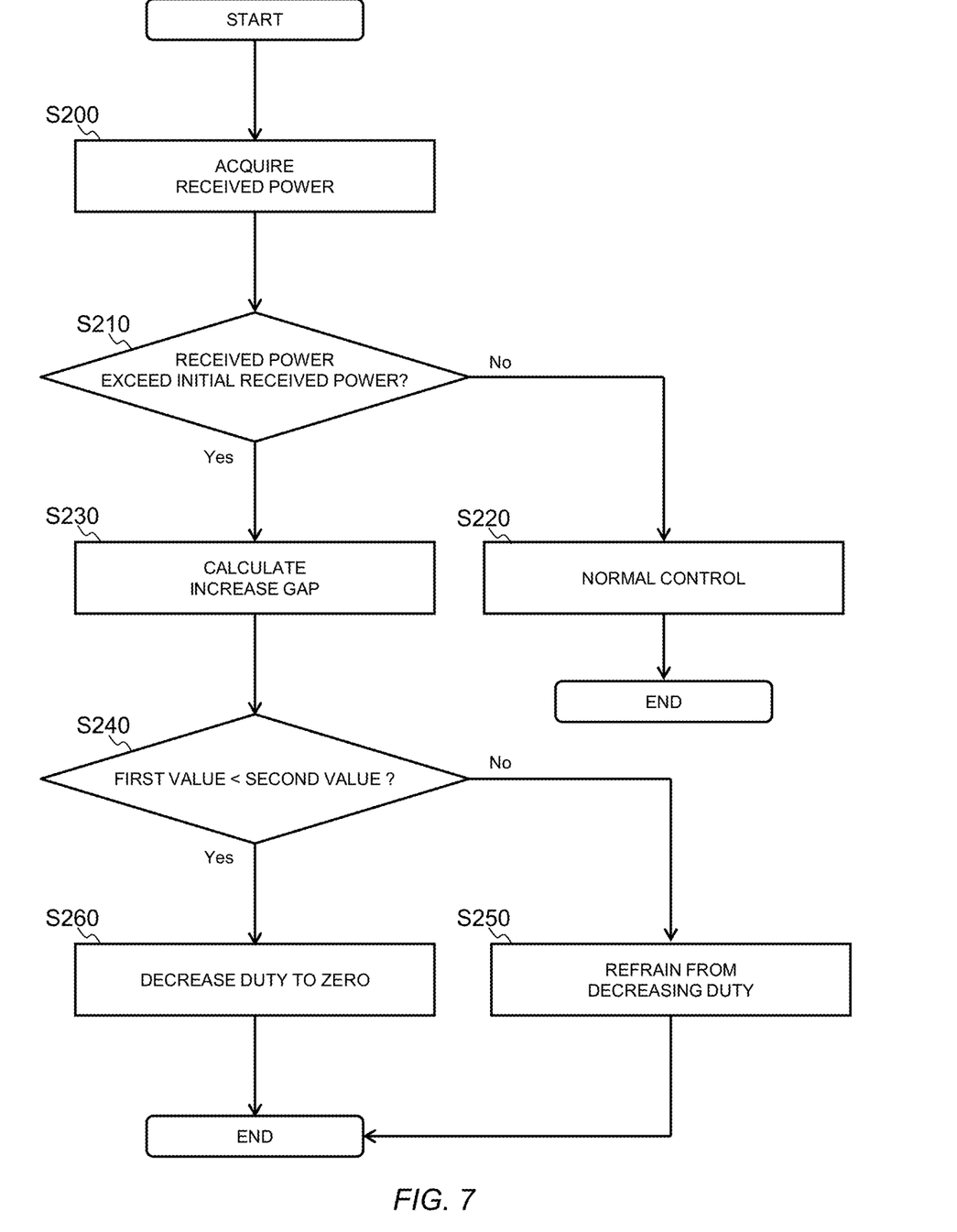
FIG. 7 is a flowchart showing an example of processes executed by a power receiving control apparatus according to the present embodiment.

In the following, the process executed while the power receiving control apparatus 200 according to the present embodiment is performing the PWM control will be described. FIG. 7 is a flowchart showing executed while the power receiving control apparatus 200 according to the present embodiment is performing the PWM control. The flowchart shown in FIG. 7 is repeatedly executed at a predetermined processing cycle while the PWM control being performed.

In step S200, the power receiving control apparatus 200 acquires a current received power of the power receiver 210.

After step S200, the process proceeds to step S210.

In step S210, the power receiving control apparatus 200 determines whether or not the current received power acquired in step S200 exceeds the initial received power. The power receiving control apparatus 200 may determine whether or not the current received power exceeds the initial received power by checking a coordinate position of the current duty and the current received power in the change characteristic of the received power managed in advance (see the power increase zone 10 shown in FIG. 4).

When the current received power does not exceed the initial received power (step S210; No), the power receiving control apparatus 200 continuously performs the normal control depending on the amount of the received power (step S220).

When the current received power exceeds the initial received power (step S210; Yes), the process proceeds to step S230.

In step S230, the power receiving control apparatus 200 calculates the increase gap based on the change characteristic of the received power. Here, noting that the process according to step S230 is executed immediately after the current received power exceeds the initial received power, the current received power is on the boundary line of the power increase zone 10 in the change characteristic. Therefore, as shown in FIG. 4, the coupling coefficient can be estimated based on the current received power acquired in step S200. Then, the power receiving control apparatus 200 can calculate the increase gap based on the estimated coupling coefficient and the change characteristic.

After step S230, the process proceeds to step S240.

In step S240, the power receiving control apparatus 200 determines whether or not the first value exceeds the second value. The first value is a value obtained by adding the increase gap calculated in step S200 to the current received power acquired in step S220. The second value is a value obtained by subtracting the predetermined margin from the upper limit of the received power. It is desirable that the predetermined margin is sufficiently set depending on a measurement error of the received power. The predetermined margin may be equivalent to one in the process executed when starting the PWM control.

When the first value does not exceed the second value (step S240; No), the power receiving control apparatus 200 refrains from decreasing the duty in the PWM control in the current process. That is, in the case where the flowchart shown in FIG. 7 is repeatedly executed at a predetermined processing cycle, the power receiving control apparatus 200 refrains from decreasing the duty in the PWM control until the first value becomes smaller than the second value.

When the first value becomes smaller than the second value (step S240; Yes), the power receiving control apparatus 200 decreases the duty to zero. Then, the PWM control is ended (step S260). After step S260 is executed, the repetitive execution of the flowchart shown in FIG. 7 ends. The power receiving control apparatus 200 resumes the flowchart shown in FIG. 7 after the PWM control is started again.

As described above, the power receiving control apparatus 200 refrains from decreasing the duty in the PWM control until the first value becomes smaller than the second value when the current received power exceeds the initial received power. And when the first value becomes the second value, the power receiving control apparatus 200 decreases the duty to zero, then the PWM control is ended. It is thus possible to suppress occurrence of the overshoot when decreasing the duty. As described above, according to the power receiving control apparatus 200, it is possible to suppress occurrence of the overshoot when the PWM control is ended. And, by the power receiving control apparatus 200 executing the processes described above, a control method for controlling the power receiver 210 corresponding to the flowchart shown in FIG. 7 is realized. Further, a control program causing the power receiving control apparatus 200 to execute the processes described above can be realized.

2-3. Example

Figure 8:
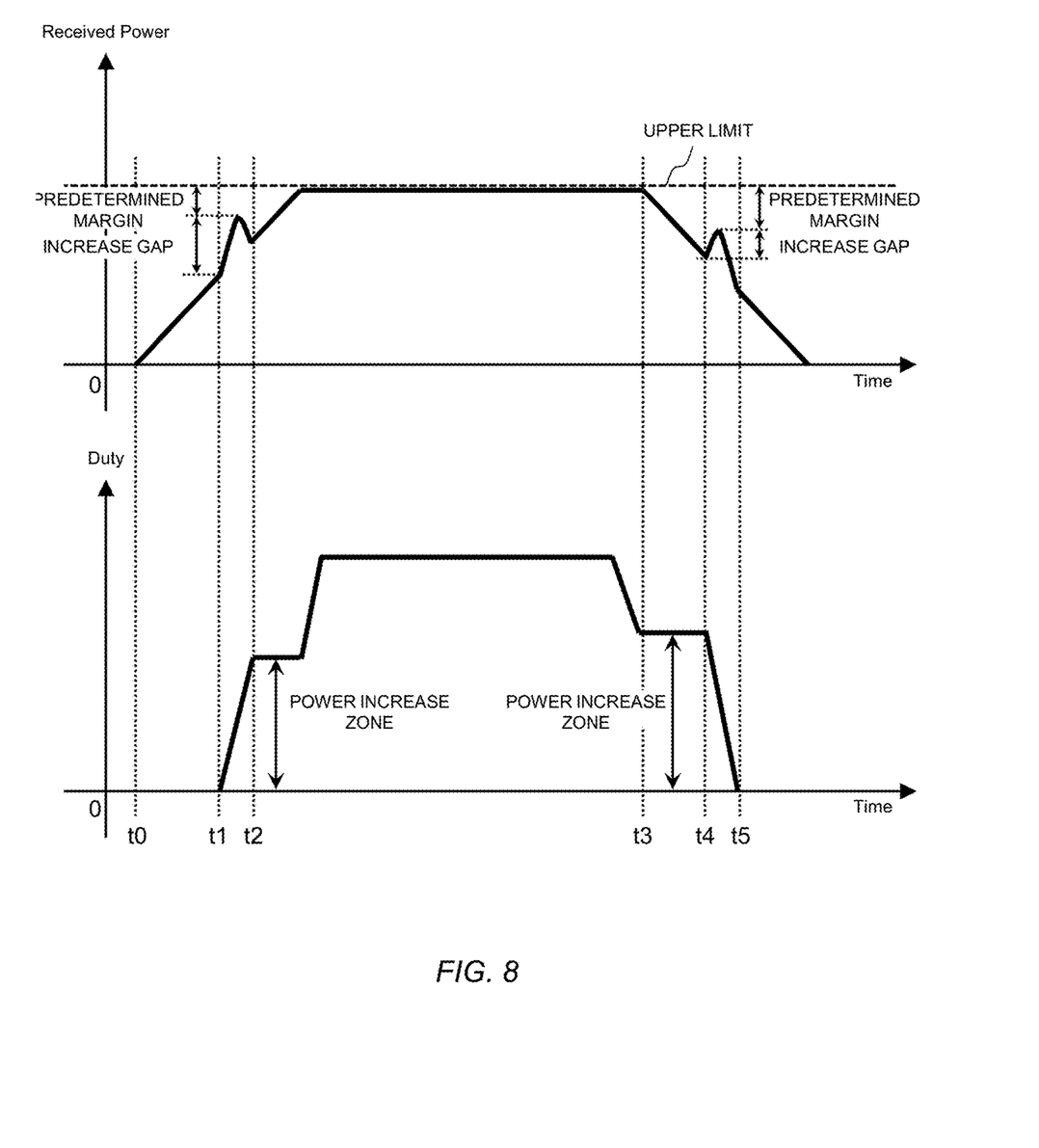
FIG. 8 is a graph showing an example of the restriction process executed by a power receiving control apparatus according to the present embodiment.

In the following, an example of the restriction process executed by the power receiving control apparatus 200 according to the present embodiment will be described. FIG. 8 shows an example of the restriction process executed by the power receiving control apparatus 200 according to the present embodiment. In FIG. 8, a graph showing the received power of the power receiver 210 and a graph showing the duty in the PWM control are illustrated with the time axes corresponding to each other. FIG. 8 shows a case where the power receiver 210 approaches the stationary power transmitter 110 and then the power receiver 210 moves away from the power transmitter 110.

In the example shown in FIG. 8, the power receiver 210 starts power receiving (transmission of electric power is started) at time t0. For example, the time t0 is a time when the power receiver 210 comes over the power transmitter 110. During a period from time t0 to time t1, since the received power is sufficiently smaller than the upper limit, the power receiving control apparatus 200 does not start the PWM control (the duty is zero).

At time t1, the first value obtained by adding the increase gap to the current received power exceeds the second value obtained by subtracting the predetermined margin from the upper limit. Therefore, the power receiving control apparatus 200 starts the PWM control. After the time t1, the power receiving control apparatus 200 increases the duty until the received power leaves the power increase zone 10. In the example shown in FIG. 8, the power receiving control apparatus 200 increases the duty until time t2. As shown in FIG. 8, it can be seen that occurrence of the overshoot is suppressed when the PWM control is started.

During a period from time t2 to time t3, the power receiving control apparatus 200 performs the PWM control depending on an amount of the received power (normal control). In this period, the power receiving control apparatus 200 can perform the PWM control in a region where the received power is smaller than the initial received power. Thus, efficient received power can be realized by the PWM control without causing the overshoot. It is predicted that the duty keeps a constant value for a while after the PWM control is started (in FIG. 8, for a while from the time t2). This is because the power receiving control apparatus 200 increases the duty until the received control leaves the power increase zone 10 when starting the PWM control.

At the time t3, the received power exceeds the initial received power. Therefore, the power receiving control apparatus 200 refrains from decreasing the duty in the PWM control.

At time t4, the first value obtained by adding the increase gap to the current received power becomes smaller than the second value obtained by subtracting the predetermined margin from the upper limit. Therefore, the power receiving control apparatus 200 decreases the duty to zero. Then, the PWM control is ended. In the example shown in FIG. 8, the duty is zero at time t5. As shown in FIG. 8, it can be seen that occurrence of the overshoot is suppressed when the PWM control is ended.

3. Configuration of Power Receiving Control Apparatus

Figure 9:
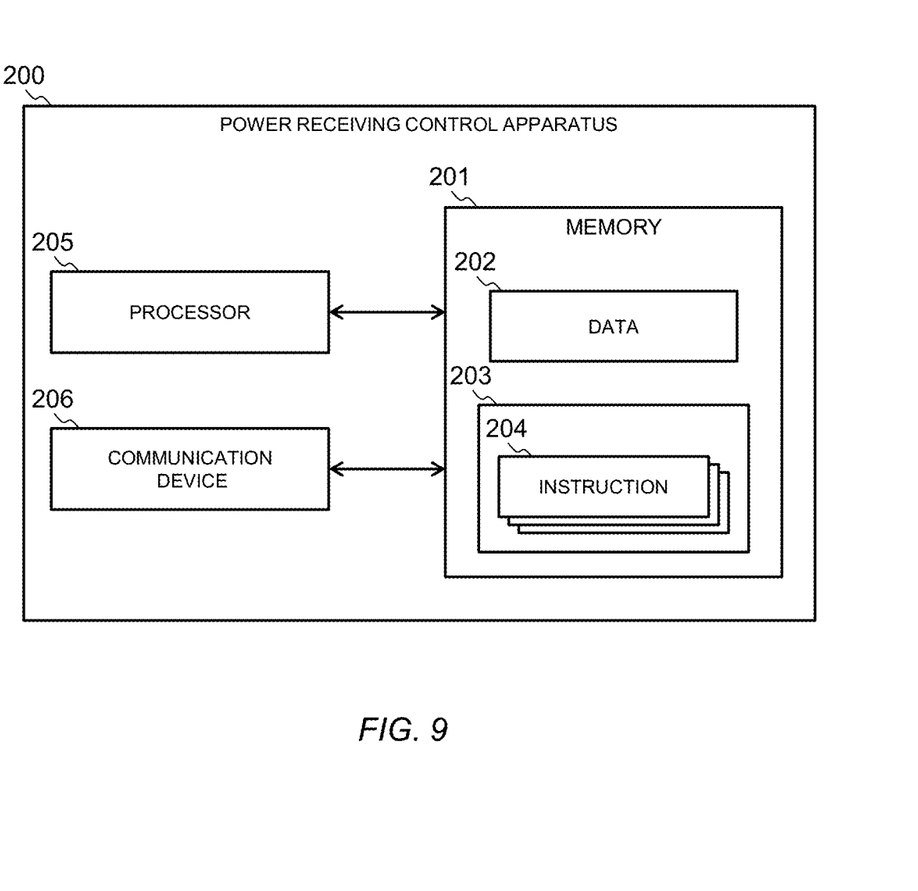
FIG. 9 is a block diagram showing a schematic configuration of a power receiving control apparatus according to the present embodiment.

In the following, a configuration of the power receiving control apparatus 200 according to the present embodiment will be described with reference to FIG. 9. FIG. 9 is a block diagram showing a schematic configuration of the power receiving control apparatus 200 according to the present embodiment. The power receiving control apparatus 200 is a computer including a memory 201, a processor 205, and a communication device 206. The memory 201 is coupled to the processor 205 and stores executable instructions 204 and various data 202 required to perform processes. The instructions 204 are provided by a control program 203. In this sense, the memory 201 may also be referred to as "program memory". The memory 201 may include a non-transitory computer readable recording medium on which the control program 203 is recorded. The data 202 stored in the memory 201 include information regarding the change characteristic of the received power.

The communication device 206 transmits/receives information to/from devices external to the power receiving control apparatus 200. Examples of the communication device 206 include a device performs wide-range communication with the power transmission control apparatus 100 or the power transmitter 110, a GPS receiver, or the like. Examples of information received by the communication device 206 include the received power of the power receiver 210, the specification information and the identification information of the power receiver 210, GPS position information, or the like. The power receiving control apparatus 200 may acquire mapping information that gives the change characteristic of the received power via the communication device 206. Information received by the communication device 206 is stored in the memory 201 as the data 202.

The instructions 204 are configured to cause the processor 205 to execute the restriction process. In particular, the instructions 204 are configured to execute the processor 205 to execute the processes shown in FIG. 6 and FIG. 7. That is, when the processor 205 operates in accordance with the instructions 204, the execution of the processes shown in FIG. 6 and FIG. 7 is realized.

P 4. Effect

As described above, according to the present embodiment, when the first value obtained by adding the increase gap to the current received power exceeds the second value obtained by subtracting the predetermined margin from the upper limit of the received power, the PWM control is started. Furthermore, when starting the PWM control, the duty is increased until the received power becomes lower than the initial received power, that is, until the received power leaves the power increase zone 10. In addition, while the PWM control is performed, when the current received power exceeds the initial received power, decreasing the duty is refrained until the first value becomes smaller than the second value. And when the first value becomes smaller than the second value, the duty is decreased to zero. Then, the PWM control is ended. It is thus possible to suppress occurrence of the overshoot in the restriction process employing the PWM control. Consequently, it is thus possible to reduce the risk of deterioration or failure of the power receiver 210 and the battery 2.

In the above, the wireless power transmission system using resonant inductive coupling has been described. The wireless power transmission system according to the present embodiment can be similarly applied to other forms such as a wireless power transmission system using electromagnetic induction.

What is claimed is:

1. A control method for controlling a power receiver which wirelessly receives electric power from a power transmitter, comprising restricting received power by pulse width modulation (PWM) control depending on an amount of the received power, wherein the restricting the received power by the PWM control comprises:
- calculating an increase gap which is a difference between an initial received power, which is the received power when the restriction process is not executed, and a local maximum value of the received power with respect to a change in a duty in the PWM control;
- starting the PWM control when a first value which is a value obtained by adding the increase gap to a current received power exceeds a second value which is a value obtained by subtracting a predetermined margin from an upper limit of the received power; and
- increasing the duty until the received power becomes lower than the initial received power when starting the PWM control.

2. The control method according to claim 1, wherein the restricting the received power by the PWM control further comprises:
- when the received power exceeds the initial received power, refraining from decreasing the duty until the first value becomes smaller than the second value; and
- decreasing the duty to zero when the first value becomes smaller than the second value.

3. A non-transitory computer readable recording medium on which a control program for controlling a power receiver which wirelessly receives electric power from a power transmitter is recorded, the control program, when executed by a computer, causing the computer to execute a restriction process that restricts received power by pulse width modulation (PWM) control depending on an amount of the received power, wherein the restriction process comprises:
- calculating an increase gap which is a difference between an initial received power, which is the received power when the restriction process is not executed, and a local maximum value of the received power with respect to a change in a duty in the PWM control;
- starting the PWM control when a first value which is a value obtained by adding the increase gap to a current received power exceeds a second value which is a value obtained by subtracting a predetermined margin from an upper limit of the received power; and
- increasing the duty until the received power becomes lower than the initial received power when starting the PWM control.

4. The non-transitory computer readable recording medium according to claim 3, wherein the restriction process further comprises:
- when the received power exceeds the initial received power, refraining from decreasing the duty until the first value becomes smaller than the second value; and
- decreasing the duty to zero when the first value becomes smaller than the second value.

* * * * *